W. J. STEINLE.
TIRE BUILDING MACHINE.
APPLICATION FILED MAR 20, 1916.
1,299,410.
Patented Apr. 1, 1919.
2 SHEETS—SHEET 1.
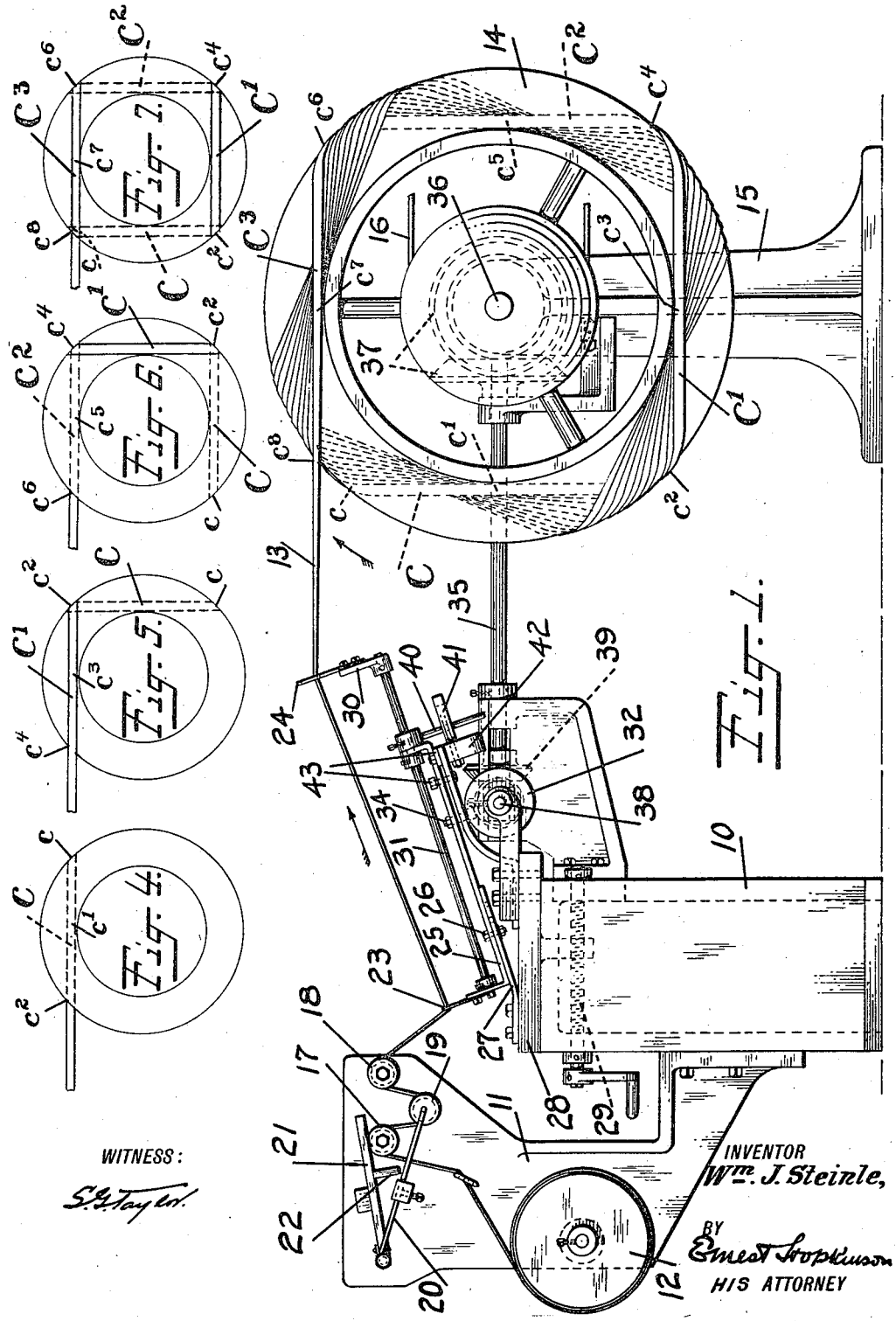
WITNESS:
S. G. Taylor
INVENTOR
Wm. J. Steinle,
BY
Ernest Hopkinson
HIS ATTORNEY

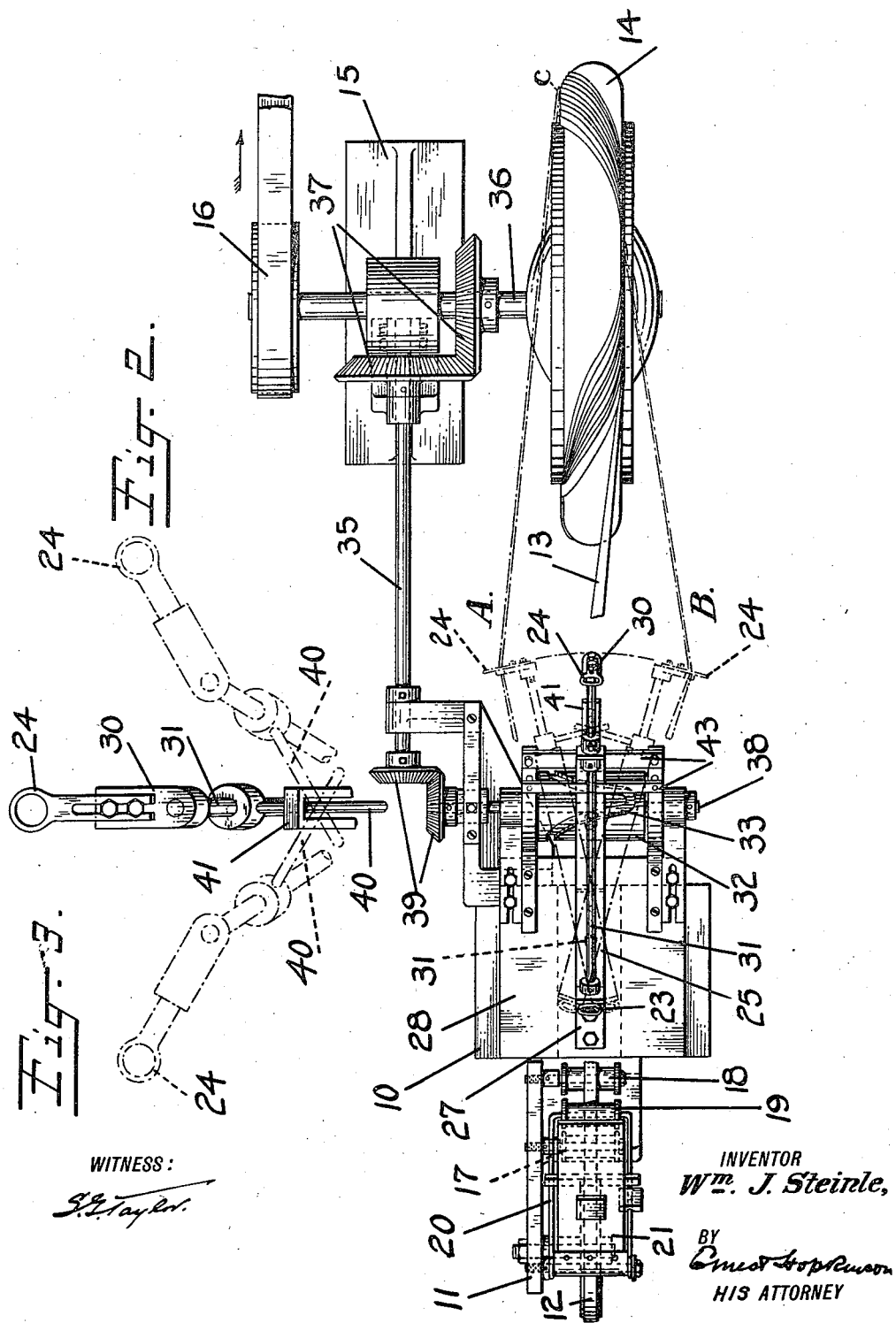

UNITED STATES PATENT OFFICE.

WILLIAM J. STEINLE, OF ELMHURST HEIGHTS, NEW YORK, ASSIGNOR TO MORGAN & WRIGHT, A CORPORATION OF MICHIGAN.

TIRE-BUILDING MACHINE.

1,299,410.  Specification of Letters Patent.  Patented Apr. 1, 1919.

Application filed March 20, 1916. Serial No. 85,298.

*To all whom it may concern:*

Be it known that I, WILLIAM J. STEINLE, a citizen of the United States, residing at Elmhurst Heights, L. I., county of Queens, and State of New York, have invented certain new and useful Improvements in Tire-Building Machines, of which the following is a full, clear, and exact description.

This invention relates to the manufacture of tires and more particularly to the manufacture of tires of the type wherein the material of which the carcass is made, consists of cords, threads, bands, and the like, which run in approximately tangential lines from the edges of the tire in a zig-zag circumferentially progressive path around the tire. That is to say the support upon which the casing is built is substantially the form of the cavity of the casing and means are provided for laying the filamentary material thereon in a path crossing the form and constantly progressing circumferentially thereof. By my invention, such a tire is automatically made with exactness of construction and tension not attainable by hand.

The invention consists in the noval construction, arrangement, and combination of the various parts hereinafter described, claimed and illustrated in the accompanying drawing, in which—

Figure 1 is a side elevation of a tire building machine constructed in accordance with the invention.

Fig. 2 is a plan view of the parts shown in Fig. 1.

Fig. 3 is a detail view in elevation illustrating movements of the guide mechanism.

Figs. 4 to 7 inclusive are diagrammatic views showing steps in applying a complete cycle of the tire material to the core.

Referring now to the drawing, 10 designates a base having an extension 11 upon which is mounted a stock roll 12 from which filamentary tire material 13, which in the present embodiment, consists of a band of fabric, comprising a number of parallel threads held together by rubber, is supplied to a support of any usual or preferred construction, the same being shown in the present instance as a ring core 14 of the usual type used to support a tire in the process of manufacture. The support is mounted upon a standard 15 and is adapted to be power driven as indicated at 16, or otherwise.

The filamentary material is drawn by the support onto its surface under tension, exerted in the present embodiment by rollers 17, 18 and 19, the material passing over the rollers 17 and 18 and under the roller 19 which latter is yieldingly mounted by means of a weighted pivoted arm 20. A pivoted weighted brake 21 frictionally engages the material while passing over the roller 17. The pressure of the brake is automatically regulated by the guide mechanism, hereinafter described, to accommodate changes in the speed of feeding the material, such regulating mechanism comprising the pivoted arm 20 contacting with a finger 22 carried by the brake whereby the brake is forced up against the pressure of its weight, for this purpose.

On the way to the ring core, the material is intercepted by guide mechanism comprising guide eyes 23 and 24, the eye 23 being secured to a rock frame 25 which is pivoted as shown at 26 upon an arm 27 secured to a carriage 28 which is adjustable on the support 10 toward and away from the core by a worm shaft 29, and the eye 24 being adjustably secured to the offset end 30 of a shaft 31 that is journaled in the rock frame. This guide mechanism is moved transversely of the core by means of a cam cylinder 32 which has a surface groove 33 into which there projects a pin 34 carried by the frame. The cam groove is of such profile as to carry the rock frame through one complete stroke, across the core and back, during each single revolution of the cam cylinder.

In the present embodiment, the cam cylinder is rotated positively at a speed of slightly less than two revolutions during each single revolution made by the core, for this purpose there being a shaft 35 connected to the shaft 36 of the core by means of bevel gears 37, and connected to the shaft 38 of the cam cylinder by bevel gears 39. The guide eye 24 is consequently rocked through nearly two complete strokes, that is, over and back nearly twice, during each single revolution made by the ring core.

A rod 40 projects downwardly from the shaft 31 and loosely passes at the free end through a slot in a bar 41 which is adjustably secured to a frame 42 carried by the base 10, the frame having spaced parallel portions 43 which support and form guides for the free end of the rock frame.

The rod slides through the slot during each stroke of the rock frame and operates to turn the shaft 31 on its axis, thereby causing the offset guide eye 24 to oscillate in a curved path somewhat similar to the transverse profile of the core, as shown in Fig. 3, and at a greater speed while passing the center of its stroke than at the ends of its stroke.

As a result of the curved path of travel of the guide eye, during the initial stages of each stroke toward the core, the guide eye continually rises and thus compensates for upward travel of all points on the surface of the revolving core nearest the guide eye, so that the material, as will presently be explained, is laid on the sides of the core substantially tangential to the inner edges of the tire being built. Since the surface of the tire forming core increases in diameter from its inner edge to its periphery, there is a corresponding increase in the surface speed of the path along which the filamentary material is applied. To compensate for this, the guide eye is moved at a continually increasing speed toward and at a continually decreasing speed from the center of its stroke, as above explained, to lay the material across the tread of the core in as near as possible the same line as the tangentially-laid portions thereof.

I will now describe the laying of one complete cycle of the material upon the core. Assume the guide mechanism to be positioned as shown in dotted lines A, Fig. 2, and that one end of the material is applied to the core, to which it adheres, at the point $c$, Figs. 2 and 4. Upon the machine being started, the guide eye 24 advances and, as shown in Fig. 4, lays the strand C on the core along an approximately straight line from the point $c$ on the tread of the core to a point $c'$ on the inner edge of the core which it strikes at a tangent, and from thence to a second point $c^2$ on the tread of the core. The eye then carries the material diagonally across the core and measures off a sufficient length to make the next tangential strand as indicated in dotted lines B, Fig. 2. During this operation the core has turned through a quarter revolution thereby advancing the point $c^2$ to the position shown in Fig. 5.

During its return stroke the guide eye lays the second strand C', which is on the opposite side of the core from the first laid strand and runs in a similar manner, that is in approximately a straight line from the point $c^2$ to the point $c^4$ on the tread of the core and tangent at the point $c^3$ to the inner edge thereof, and then carries the material across the core and measures off a sufficient length for the next strand. Meanwhile the core has turned through a second quarter revolution thereby advancing the point $c^4$ to the position shown in Fig. 6.

In like manner during the next advance stroke, the guide eye brings the material across the core and forms a third strand $C^2$ which is on the same side of the core as the strand C and extends from the point $c^4$ to the point $c^6$, being tangent at the point $c^5$ to the edge thereof. Meanwhile the core has turned through a third quarter revolution thereby advancing the point $c^6$ to the position shown in Fig. 7. During the return stroke the guide eye completes the cycle by carrying the material across the core to form the fourth strand $C^3$, which is on the same side of the core as the strand C' and extends from the point $c^6$ to the point $c^8$, being tangent at the point $c^7$ to the inner edge thereof.

The point $c^8$ of the strand $C^3$ is slightly in advance of the point $c$ of the strand C due to the guide eye making slightly less than two complete strokes while the core is making one complete revolution. Thus, through successive wrapping of the material in a zig-zag circumferential constantly progressing path on the core, as above described, to form other strands, each strand will overlap the corresponding strand immediately preceding it, and in the consecutive cycles or circuits of the material, the crossing points will be distributed in suitable succession about the inner edges of the tire being built. And finally a tire casing will be formed upon the support composed of filamentary material which crosses the support from edge to edge and constantly progresses longitudinally thereof.

In the present embodiment, I have illustrated the usual type of tire forming core 14 wherein the side walls are undercut, so that they approach each other at their inner edges. When the material is laid upon such a core it must be pushed into place against the core at the tangent points, and the strands at their tangent points will, of course, have the outward slope of the side walls of the core.

In the manufacture of various sizes of tires, corresponding changes may be made in the timing of the stroke of the guide eye, and this may be done by adjusting the slotted bar 41 vertically upon its supporting frame 42. Or a like result may be produced by adjusting the guide eye 24 vertically on the offset end 30 of the shaft 31. The position of the guide eye 24 with respect to the particular size of core upon which a tire is to be built, may be varied by applying the worm shaft 29 to move the mechanism as a unit toward or away from the core. Furthermore, the above described various adjustments may be made to effect the laying of the strands at other angles on the core than that illustrated and described, should this be desirable.

I do not limit myself to the construction ilustrated and described, since various changes may be made within the scope of the appended claims. There is a wide range of variations in the construction, relative location of parts, timing of relative speeds, etc., that may be made without departing from the spirit of sacrificing any of the advantages of the invention.

Having thus described my invention, what I claim as new and desire to protect by Letters Patent is:

1. A tire building machine, comprising a revoluble support of substantially the form of the cavity of the casing, means reciprocable transversely of the support for guiding material to the support, and means for moving the guiding means at a faster speed at the center of stroke than at the ends of stroke whereby the material will be laid substantially diagonal across the support at intervals and therebetween will be laid substantially tangential to the inner edges of the tire being built.

2. A tire building machine, comprising a revoluble support of substantially the form of the cavity of the casing, a pivoted shaft mounted for swinging movement transversely of the support, means for swinging the shaft on its pivot, a guide eye offset from the shaft for directing material to the support, and means for rocking the shaft on its axis during its transverse stroke to cause the guide eye to move at a faster speed at the center of stroke than at the ends of stroke.

3. A tire building machine, comprising a revoluble support of substantially the form of the cavity of the casing, a guide eye for directing material to the support, means for moving the guide eye transversely of the support to lay the material across the support at intervals and therebetween lay it substantially tangentially to the inner edges of the tire being built, and means for modifying the transverse movement of said eye with relation to said support for varying the position of the tangential portions of the material with respect to the inner edges of the support.

Signed at New York, N. Y., this 16 day of March, 1916.

WILLIAM J. STEINLE.